(12) United States Patent
Sakamoto

(10) Patent No.: US 11,578,769 B2
(45) Date of Patent: Feb. 14, 2023

(54) BRAKE HYDRAULIC PRESSURE CONTROLLER

(71) Applicant: Robert Bosch GmbH, Stuttgart (DE)

(72) Inventor: Takanori Sakamoto, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 17/046,849

(22) PCT Filed: Mar. 22, 2019

(86) PCT No.: PCT/IB2019/052338
§ 371 (c)(1),
(2) Date: Oct. 12, 2020

(87) PCT Pub. No.: WO2019/197921
PCT Pub. Date: Oct. 17, 2019

(65) Prior Publication Data
US 2021/0033158 A1    Feb. 4, 2021

(30) Foreign Application Priority Data

Apr. 10, 2018 (JP) .............................. JP2018-075097

(51) Int. Cl.
*F16F 1/371* (2006.01)
*F16D 65/00* (2006.01)
(Continued)

(52) U.S. Cl.
CPC .......... *F16D 65/0056* (2013.01); *B62L 3/023* (2013.01); *F16D 65/18* (2013.01);
(Continued)

(58) Field of Classification Search
CPC ........ B60T 8/3685; B60T 8/368; B60T 17/02; F16F 1/36; F16F 1/3605; F16F 3/08;
(Continued)

(56) References Cited

U.S. PATENT DOCUMENTS 4,416,446 A * 11/1983 Murakami ................ F16F 1/37
267/140.3
5,464,187 A * 11/1995 Linkner, Jr. .......... B60T 8/3685
303/113.1
(Continued)

FOREIGN PATENT DOCUMENTS

DE      102004034226 A1   3/2005
EP           2783929 A1  10/2014
(Continued)

OTHER PUBLICATIONS

International Search Report and Written Opinion for Application No. PCT/IB2019/052338 dated Jul. 12, 2019 (12 pages).

*Primary Examiner* — Bradley T King
*Assistant Examiner* — Stephen M Bowes
(74) *Attorney, Agent, or Firm* — Michael Best & Friedrich LLP

(57) ABSTRACT

It is possible to prevent occurrence of a resonance phenomenon of a hydraulic unit and to improve attachability/detachability of the hydraulic unit to/from a bracket. A support section (42, 43) includes: a fixture member (80) that is fixed to a housing (30) for a hydraulic unit (10); and a vibration absorbing member (75) that is interposed between the housing (30) and a bracket (41) and has a through-hole (75a) through which the fixture member (80) passes. The vibration absorbing member (75) includes two vibration absorbing members (75B, 75C, 75D) having different rebound resilience from each other. In a state where the vibration absorbing member (75) is partially accommodated in a recessed section (47) of the bracket (41), the vibration absorbing member (75) is held between the housing (30) and the bracket (41).

7 Claims, 7 Drawing Sheets

(51) Int. Cl.
  *B62L 3/02* (2006.01)
  *F16D 65/18* (2006.01)
  *F16F 3/093* (2006.01)
  *F16D 121/02* (2012.01)

(52) U.S. Cl.
  CPC .......... *F16F 3/093* (2013.01); *B60T 2270/10* (2013.01); *F16D 2121/02* (2013.01)

(58) Field of Classification Search
  CPC .......... F16F 3/087; F16F 3/093; F16F 3/0935; F16F 1/371; F16F 1/3732; F16F 15/08; B62L 3/023; F16D 2121/02; F16D 65/0056; F16D 65/18
  USPC .......................................... 411/383, 384, 385
  See application file for complete search history.

(56) References Cited

U.S. PATENT DOCUMENTS

| | | | | | |
|---|---|---|---|---|---|
| 5,569,008 | A | * | 10/1996 | Chapkovich | F16B 33/006 411/383 |
| 5,622,483 | A | * | 4/1997 | Nokubo | B60T 8/3685 417/363 |
| 6,099,190 | A | * | 8/2000 | Honobe | F16B 37/00 248/225.11 |
| 7,389,977 | B1 | * | 6/2008 | Fernandez | F16F 3/087 267/293 |
| 8,444,359 | B2 | * | 5/2013 | Grether | B64D 11/0696 29/525.02 |
| 2003/0155809 | A1 | * | 8/2003 | Schlitzkus | B60T 8/3685 267/293 |
| 2005/0040576 | A1 | * | 2/2005 | Oxenknecht | F16F 1/3735 267/293 |
| 2008/0217824 | A1 | * | 9/2008 | Schlitzkus | F16F 1/3732 267/141.1 |
| 2009/0242725 | A1 | * | 10/2009 | Tanabe | B60T 8/3685 303/3 |

FOREIGN PATENT DOCUMENTS

| | | | | |
|---|---|---|---|---|
| FR | 1440023 | A | | 5/1966 |
| JP | 60220234 | A | * | 11/1985 ............... F16F 3/093 |
| JP | H07156774 | A | | 6/1995 |
| JP | 2005067310 | A | | 3/2005 |
| JP | 2015113899 | A | | 6/2015 |
| JP | 2016203880 | A | | 12/2016 |
| WO | 9509752 | A1 | | 4/1995 |
| WO | WO-2004097245 | A1 | * | 11/2004 ............ F16F 1/3835 |

* cited by examiner

[FIG. 1]
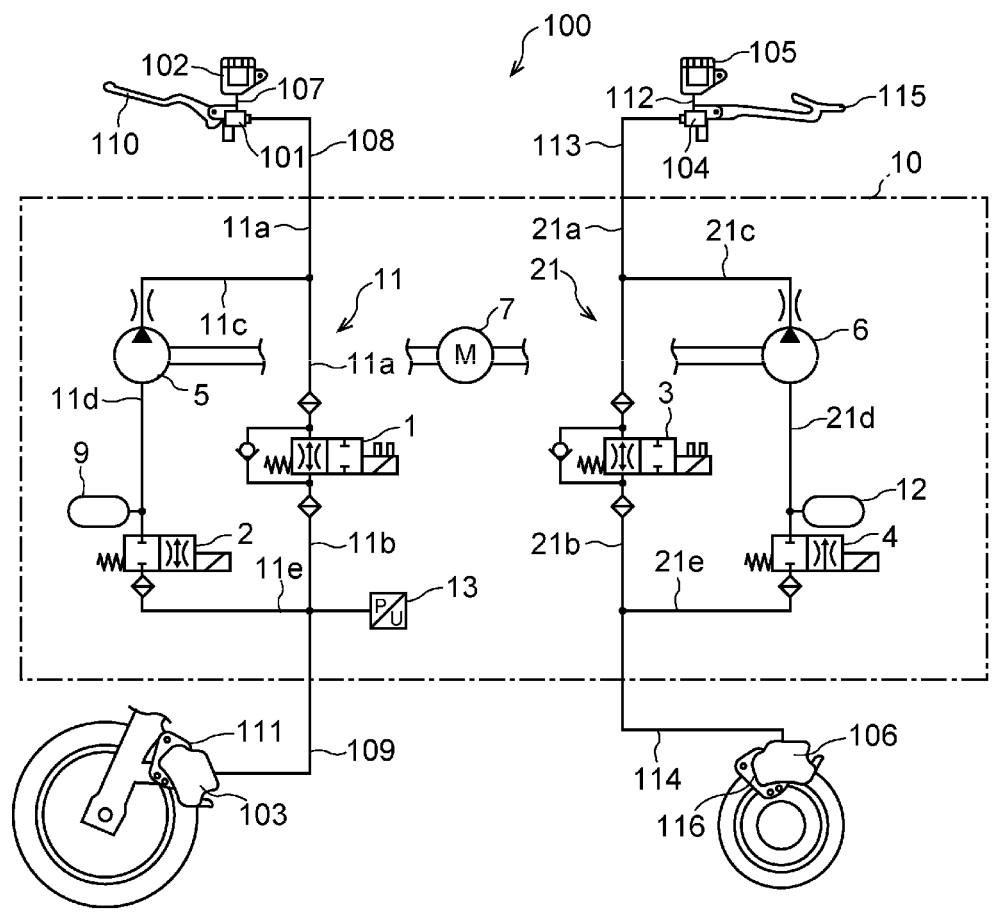

[FIG. 2]
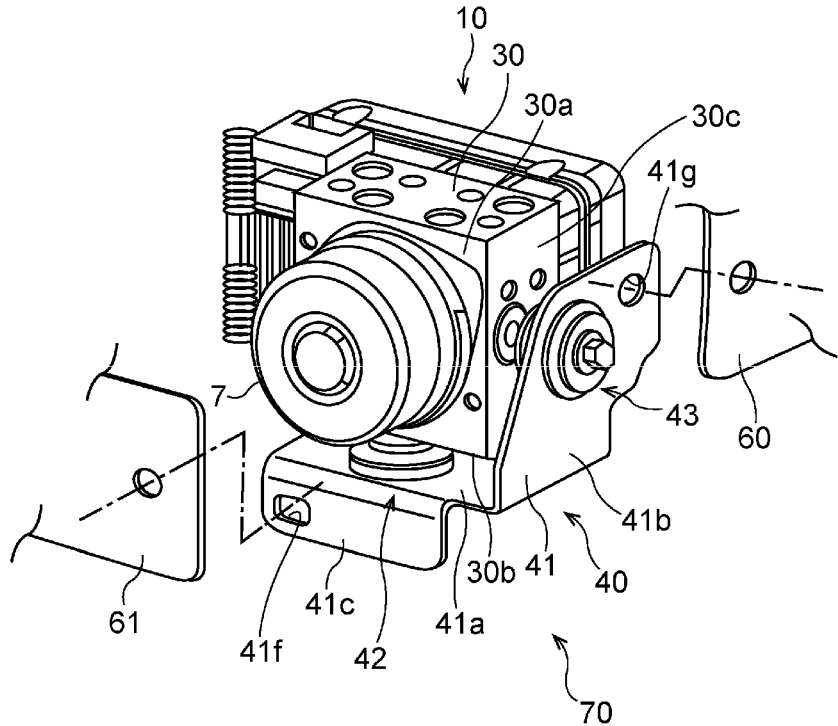
[FIG. 3]
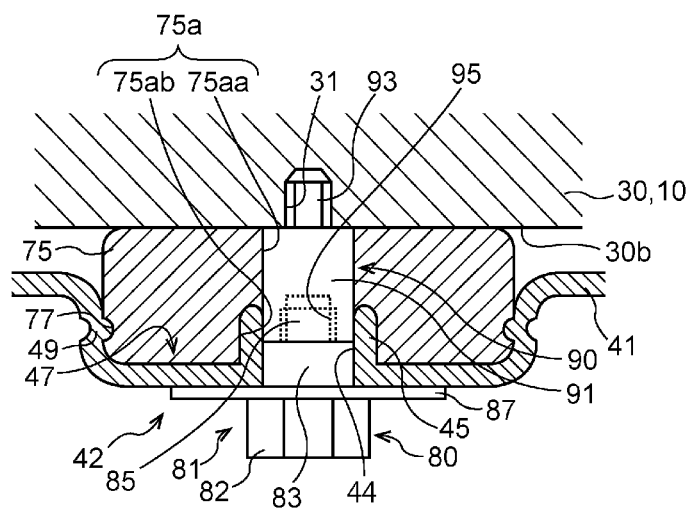

[FIG. 4]
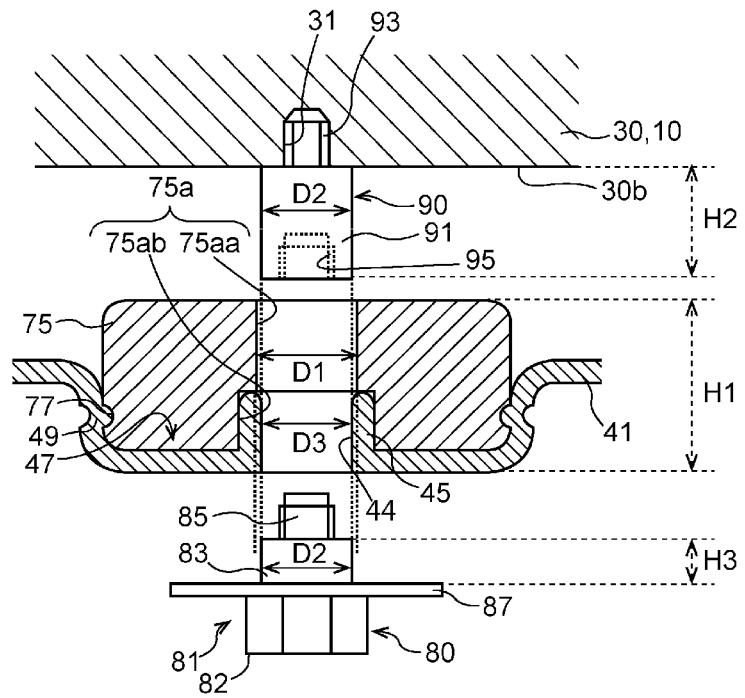
[FIG. 5]
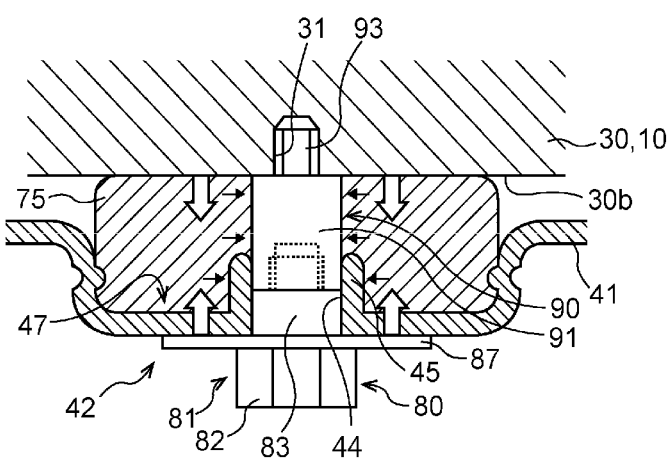

[FIG. 6]
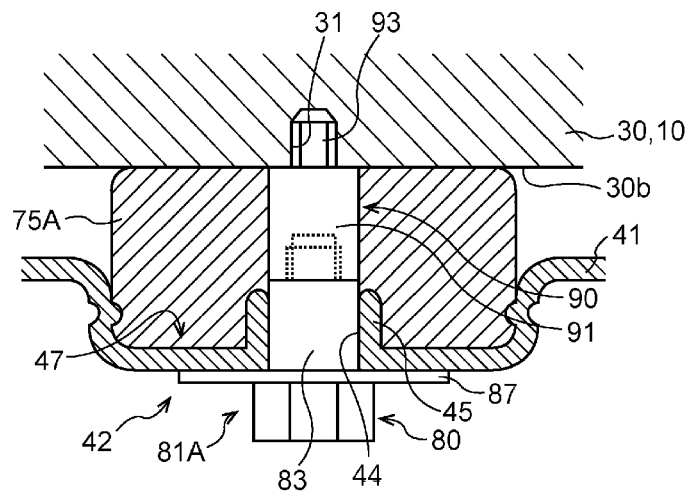
[FIG. 7]
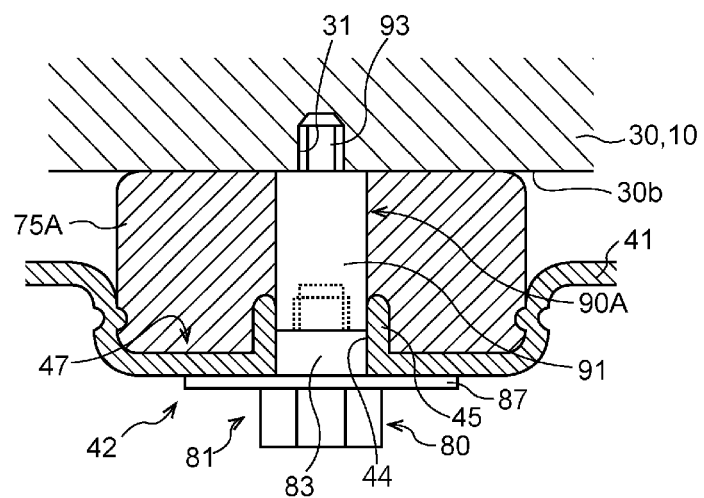

[FIG. 8]
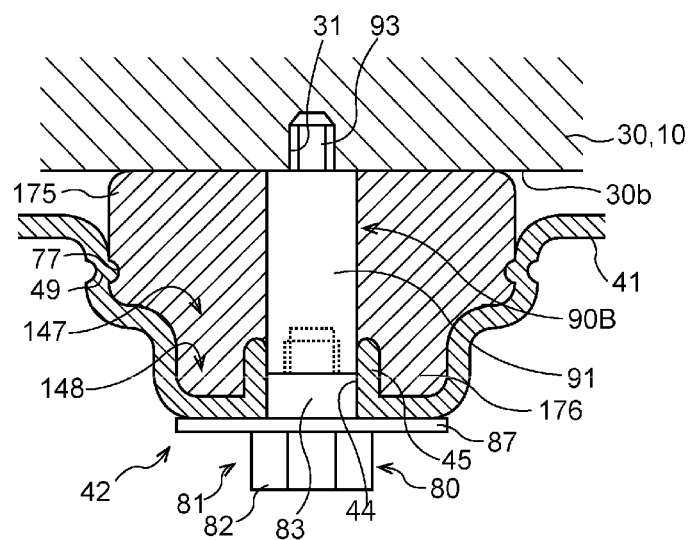
[FIG. 9]
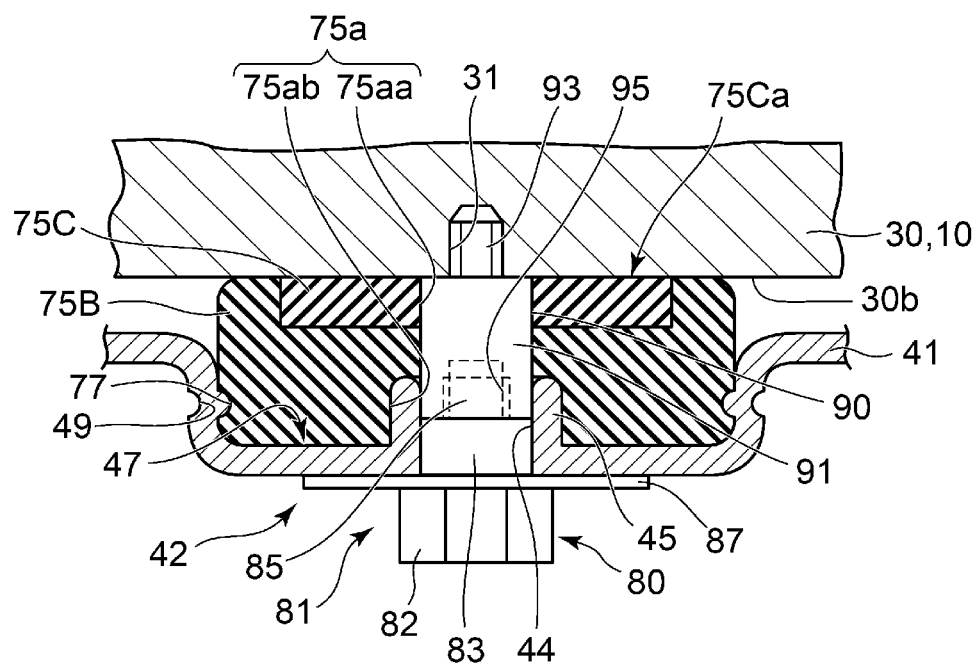

[FIG. 10]
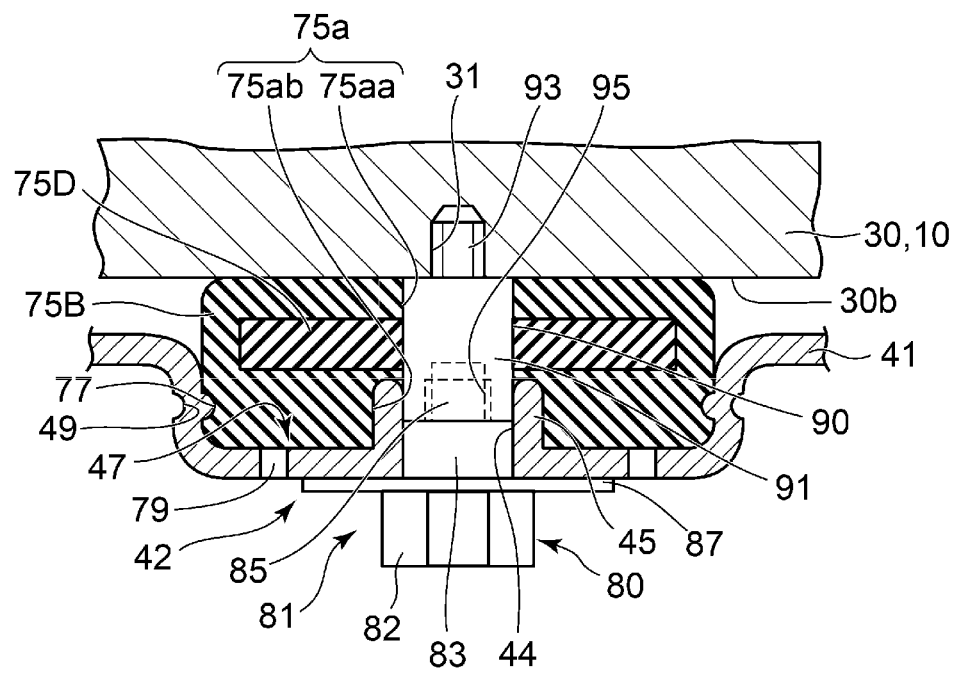
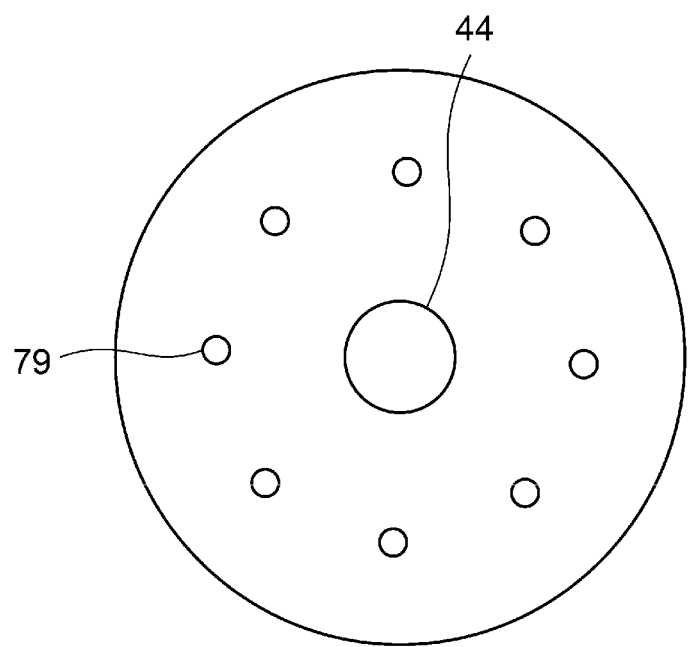

[FIG. 11]
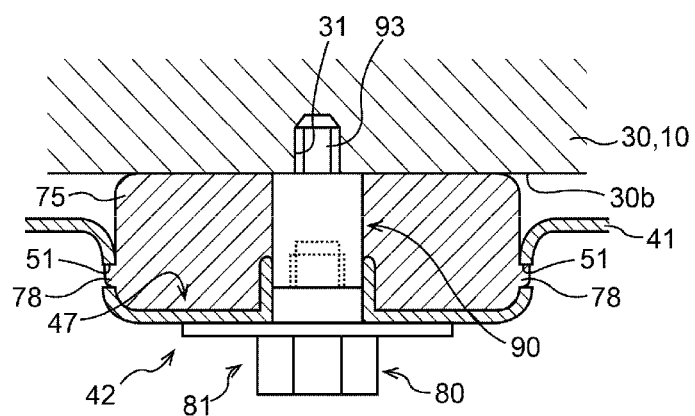

BRAKE HYDRAULIC PRESSURE CONTROLLER

BACKGROUND OF THE INVENTION

The present invention relates to a brake hydraulic pressure controller.

Conventionally, a brake hydraulic pressure controller in which a hydraulic unit executing brake control by controlling a hydraulic pressure of a brake fluid to be supplied to a braking section in a hydraulic circuit is attached to a vehicle body via a bracket has been known. In such a brake hydraulic pressure controller, the hydraulic unit is supported on the bracket by a support section having a single antivibration member that is assembled to an opening provided in the bracket (for example, see JP-A-2015-113899).

SUMMARY OF THE INVENTION

In the case where a vibration at a frequency close to the natural frequency of a vibration system of the hydraulic unit is applied from a vehicle side, a resonance phenomenon occurs, and the hydraulic unit vibrates significantly. A conventional brake hydraulic unit-supporting structure has a single type of antivibration member interposed between the brake hydraulic unit and the bracket to support the brake hydraulic unit. In order to prevent the occurrence of the resonance phenomenon, it is required to change the design of properties of a single type of antivibration rubber or to change the design of the structure of the brake hydraulic unit or the supporting structure.

In addition, in the conventional brake hydraulic pressure controller described in JP-A-2015-113899, the antivibration member is assembled to the opening of the bracket, and plate through-holes in a sleeve shape and two plates are assembled. Then, the hydraulic unit has to be fixed by using a fixture member. Thus, there is room for improvement in assemblability of the hydraulic unit to the bracket.

Furthermore, in the case where failure of the hydraulic unit occurs after the attachment of the hydraulic unit to the vehicle body, or the like, the hydraulic unit is possibly detached for inspection and the like. The hydraulic unit is desirably attached/detached such that as few replacement parts as possible are required in such a case.

The present invention has been made in view of the above problem, and provides a support structure of a brake hydraulic unit capable of preventing occurrence of a resonance phenomenon of the brake hydraulic unit by regulating a vibration frequency applied from a vehicle side in a manner not to be superposed on a natural frequency of a vibration system in the brake hydraulic unit.

Furthermore, the present invention provides a brake hydraulic pressure controller capable of improving attachability/detachability of a hydraulic unit to/from a bracket and a method for attaching the brake hydraulic pressure controller.

Solution to Problem

According to one aspect of the present invention, a brake hydraulic pressure controller including: a hydraulic unit that executes brake control by controlling a hydraulic pressure of a brake fluid to be supplied to a braking section; a bracket that is attached to a vehicle body; and a support section that is assembled to the bracket to support the hydraulic unit is provided. In the brake hydraulic pressure controller, the support section includes: a fixture member that is fixed to a housing of the hydraulic unit; and a vibration absorbing member that has a through-hole through which the fixture member passes and is interposed between the housing and the bracket, the vibration absorbing member includes: a first vibration absorbing member that has specified rebound resilience; and a second vibration absorbing member that has higher rebound resilience than the specified rebound resilience, and, in a state of being accommodated in a recessed section of the bracket, the vibration absorbing member is partially held between the housing and the bracket.

As it has been described so far, according to the present invention, it is possible to prevent occurrence of a resonance phenomenon of the hydraulic unit and to improve attachability/detachability of the hydraulic unit to/from the bracket.

BRIEF DESCRIPTION OF DRAWINGS

FIG. 1 is a circuit diagram of a brake hydraulic circuit according to an embodiment of the present invention.

FIG. 2 is a perspective view of a brake hydraulic pressure controller.

FIG. 3 is a cross-sectional view of a configuration example of a support section according to the embodiment.

FIG. 4 is a view for illustrating a method for assembling a hydraulic unit according to the embodiment.

FIG. 5 is a view for illustrating operational effects of the support section according to the embodiment.

FIG. 6 is a cross-sectional view of a modified example of the support section according to the embodiment.

FIG. 7 is a cross-sectional view of another modified example of the support section according to the embodiment.

FIG. 8 is a cross-sectional view of yet another modified example of the support section according to the embodiment.

FIG. 9 is a cross-sectional view of a modified example of mount rubber according to the embodiment.

FIG. 10 is a cross-sectional view of a modified example of the mount rubber according to the embodiment.

FIG. 11 is a cross-sectional view of a modified example of the support section according to the embodiment.

DETAILED DESCRIPTION

Hereinafter, preferred embodiments of the present invention will be described in detail with reference to the accompanying drawings. In the description and drawings, elements or components having substantially the same functions or features are denoted by the same reference signs so that repeated description will be omitted.

<1. Brake Hydraulic Circuit>

FIG. 1 illustrates an example of a brake hydraulic circuit 100 to which a brake hydraulic pressure controller 70 according to an embodiment of the present invention can be applied.

The brake hydraulic circuit 100 illustrated in FIG. 1 is mounted on a two-wheeled motor vehicle, for example, and is configured as a hydraulic circuit for well-known anti-lock brake control. Here, anti-lock brake control (so-called ABS control) indicates such control that a brake hydraulic pressure is intermittently reduced to prevent a locked state of a wheel during braking of the vehicle, for example. Note that a description will hereinafter be made on the hydraulic circuit for the anti-lock brake control that is mounted on the two-wheeled motor vehicle for convenience of the description. However, the invention of the present application is not limited to the brake hydraulic pressure controller for the two-wheeled motor vehicle but can also be used for a brake hydraulic pressure controller that is mounted on a four-wheeled motor vehicle and executes the anti-lock brake control and electric stability control.

In addition, because actuation principle, a basic control method, and the like of the anti-lock brake control have been known to persons skilled in the art. Thus, a detailed description thereon will not be made.

The brake hydraulic circuit 100 includes: a front-wheel master cylinder 101, a front-wheel reservoir tank 102, and a front-wheel wheel cylinder 103 provided for a front-wheel disc brake device (a braking section) 111 that generates a braking force on a front wheel; a rear-wheel master cylinder 104, a rear-wheel reservoir tank 105, and a rear-wheel wheel cylinder 106 provided for a rear-wheel disc brake device (a braking section) 116 that generates a braking force on a rear wheel; and a hydraulic unit 10.

The hydraulic unit 10 is provided between the front-wheel and rear-wheel master cylinders 101, 104 and the front-wheel and rear-wheel wheel cylinders 103, 106. The hydraulic unit 10 controls a pressure of a brake fluid that is supplied from the front-wheel master cylinder 101 to the front-wheel wheel cylinder 103, or controls a pressure of a brake fluid that is supplied from the rear-wheel master cylinder 104 to the rear-wheel wheel cylinder 106, so as to execute the above-described anti-lock brake control.

The front-wheel reservoir tank 102 is connected to the front-wheel master cylinder 101 via a first pipe 107. In addition, the front-wheel wheel cylinder 103 is connected to the front-wheel master cylinder 101 via a second pipe 108, the hydraulic unit 10, and a third pipe 109.

For example, when a handlebar lever 110 of the vehicle is operated and the front-wheel master cylinder 101 is thereby actuated, the front-wheel master cylinder 101 increases a brake hydraulic pressure of the front-wheel wheel cylinder 103 via the hydraulic unit 10. Then, in response to the supplied brake hydraulic pressure, the front-wheel wheel cylinder 103 actuates the front-wheel disc brake device 111 to brake the front wheel.

The rear-wheel reservoir tank 105 is connected to the rear-wheel master cylinder 104 via a fourth pipe 112. In addition, the rear-wheel wheel cylinder 106 is connected to the rear-wheel master cylinder 104 via a fifth pipe 113, the hydraulic unit 10, and a sixth pipe 114.

For example, when a foot pedal 115 of the vehicle is operated and the rear-wheel master cylinder 104 is thereby actuated, the rear-wheel master cylinder 104 increases a brake hydraulic pressure of the rear-wheel wheel cylinder 106 via the hydraulic unit 10. Then, in response to the supplied brake hydraulic pressure, the rear-wheel wheel cylinder 106 actuates the rear-wheel disc brake device 116 to brake the rear wheel.

<2. Hydraulic Unit>

Next, a detailed description will be made on the hydraulic unit 10. The hydraulic unit 10 includes a front-wheel supply electromagnetic valve 1, a front-wheel discharge electromagnetic valve 2, a rear-wheel supply electromagnetic valve 3, a rear-wheel discharge electromagnetic valve 4, a front-wheel pump 5, a rear-wheel pump 6, a motor 7, and an unillustrated electronic control unit (ECU).

Each of the front-wheel supply electromagnetic valve 1, the front-wheel discharge electromagnetic valve 2, the rear-wheel supply electromagnetic valve 3, and the rear-wheel discharge electromagnetic valve 4 is a well-known two-position type electromagnetic valve, for example. In a normal state, that is, a state where the anti-lock brake control is not executed, the front-wheel supply electromagnetic valve 1 and the rear-wheel supply electromagnetic valve 3 are brought into an open state, and the front-wheel discharge electromagnetic valve 2 and the rear-wheel discharge electromagnetic valve 4 are brought into a closed state. The front-wheel pump 5 and the rear-wheel pump 6 are configured to be driven by the motor 7.

The front-wheel supply electromagnetic valve 1, the front-wheel discharge electromagnetic valve 2, the rear-wheel supply electromagnetic valve 3, the rear-wheel discharge electromagnetic valve 4, and the motor 7 are connected to the ECU, and driving thereof is controlled on the basis of a control signal from the ECU.

The hydraulic unit 10 includes: a front-wheel channel 11, through which the brake fluid to be supplied from the front-wheel master cylinder 101 to the front-wheel wheel cylinder 103 flows; and a rear-wheel channel 21, through which the brake fluid to be supplied from the rear-wheel master cylinder 104 to the rear-wheel wheel cylinder 106 flows.

In the front-wheel channel 11, one end side of a first channel 11a is connected to the second pipe 108, and the other end side thereof is connected to the front-wheel supply electromagnetic valve 1. One end side of a second channel 11b is connected to the front-wheel supply electromagnetic valve 1, and the other end side thereof is connected to the third pipe 109.

One end side of a third channel 11c is connected to the first channel 11a, and the other end side of the third channel 11c is connected to a discharge side of the front-wheel pump 5. One end side of a fourth channel 11d is connected to a suction side of the front-wheel pump 5, and the other end side thereof is connected to the front-wheel discharge electromagnetic valve 2.

The front-wheel pump 5 causes the brake fluid to flow from the fourth channel 11d side to the third channel 11c side, that is, from the front-wheel wheel cylinder 103 side to the front-wheel master cylinder 101 side. An accumulator 9 that lowers the pressure of the brake fluid is connected to the fourth channel 11d.

One end side of a fifth channel 11e is connected to the second channel 11b, and the other end side of the fifth channel 11e is connected to the front-wheel discharge electromagnetic valve 2. A pressure sensor 13 that detects the pressure of the brake fluid to be supplied to the front-wheel wheel cylinder 103 is provided in the second channel 11b.

Meanwhile, in the rear-wheel channel 21, one end side of a first channel 21a is connected to the fifth pipe 113, and the other end side thereof is connected to the rear-wheel supply electromagnetic valve 3. One end side of a second channel 21b is connected to the rear-wheel supply electromagnetic valve 3, and the other end side thereof is connected to the sixth pipe 114.

One end side of a third channel 21c is connected to the first channel 21a, and the other end side of the third channel 21c is connected to a discharge side of the rear-wheel pump 6. One end side of a fourth channel 21d is connected to a suction side of the rear-wheel pump 6, and the other end side thereof is connected to the rear-wheel discharge electromagnetic valve 4.

The rear-wheel pump 6 causes the brake fluid to flow from the fourth channel 21d side to the third channel 21c side, that is, from the rear-wheel wheel cylinder 106 side to the rear-wheel master cylinder 104 side. An accumulator 12 that lowers the pressure of the brake fluid is connected to the fourth channel 21d.

One end side of a fifth channel 21e is connected to the second channel 21b, and the other end side of the fifth channel 21e is connected to the rear-wheel discharge electromagnetic valve 4.

Note that a check valve is provided along with each of the front-wheel supply electromagnetic valve 1 and the rear-wheel supply electromagnetic valve 3, and a throttle valve is provided on the discharge side of each of the front-wheel pump 5 and the rear-wheel pump 6. In addition, an unillustrated filter is provided in front of and at the rear of each of the front-wheel supply electromagnetic valve 1 and the rear-wheel supply electromagnetic valve 3, in front of each of the front-wheel pump 5 and the rear-wheel pump 6, and in front of each of the front-wheel discharge electromagnetic valve 2 and the rear-wheel discharge electromagnetic valve 4.

<3. Brake Hydraulic Pressure Controller>

FIG. 2 is a perspective view of the brake hydraulic pressure controller according to this embodiment. The brake hydraulic pressure controller 70 includes: the hydraulic unit 10; and a hydraulic unit support structure 40 including a bracket 41, a first support section 42, and a second support section 43.

The hydraulic unit 10 is attached to the hydraulic unit support structure 40, and is attached to a vehicle body via this hydraulic unit support structure 40. The first support section 42 and the second support section 43 are provided on the bracket 41.

The first support section 42 supports a lower surface 30b that is substantially perpendicular to a motor attachment surface 30a of a housing 30 for the hydraulic unit 10. The second support section 43 supports a lateral surface 30c that is formed substantially perpendicular to each of the motor attachment surface 30a and the lower surface 30b of the hydraulic unit 10.

The bracket 41 is formed in a plate shape, and includes a plate section 41a that opposes the lower surface 30b of the hydraulic unit 10 at the time when the hydraulic unit 10 is attached to the bracket 41. This plate section 41a is formed with an opening 41d (see FIG. 3), which is used to assemble the first support section 42 substantially at a center of the plate section 41a, in a manner to penetrate the plate section 41a in a thickness direction.

The bracket 41 is formed with a lateral wall section 41b that rises from the plate section 41a at a right angle. The lateral wall section 41b is formed with an opening, which is used to assemble the second support section 43, in a manner to penetrate the lateral wall section 41b in a thickness direction. In the bracket 41, a first fixing hole 41g, which is used to fix the bracket 41 to the vehicle body, is further formed in a manner to penetrate the lateral wall section 41b in the thickness direction.

The bracket 41 is formed with an attachment section 41c that is hung perpendicularly from the plate section 41a. The attachment section 41c is formed with a fixing hole 41f, which is used to fix the bracket 41 to the vehicle body, in a manner to penetrate the attachment section 41c in a thickness direction.

The brake hydraulic pressure controller 70 is attached to the vehicle body when the lateral wall section 41b and the attachment section 41c of the bracket 41 are fixed to vehicle-body side brackets 60, 61 that are fixed to the vehicle body by bolts or the like.

<4. Support Section>

FIG. 3 is a cross-sectional view illustrating the support section. The following description will be made on the first support section 42 as an example of the support section. However, the second support section 43 may also have a similar configuration.

The first support section 42 has a fixture member 80 and mount rubber 75. In this embodiment, the mount rubber 75 has a function as a vibration absorbing member. Such a first support section 42 is configured not to have a sleeve through which the fixture member 80 passes.

The bracket 41 has an annular recessed section 47 in which the mount rubber 75 is accommodated. In an outer circumference of the recessed section 47, a locking projection 49 is formed for an entire circumference. A sleeve section 45 is formed at a center of the recessed section 47.

The sleeve section 45 is a cylindrical constituent portion that is vertically provided from a bottom surface of the recessed section 47 toward the housing 30 side. An opening 44, through which the fixture member 80 passes, is formed on the inside of the sleeve section 45.

The mount rubber 75 is the substantially cylindrical vibration absorbing member that is formed of rubber, a resin, silicon, or the like having elasticity. The mount rubber 75 has a columnar shape. A columnar through-hole 75a, through which the fixture member 80 passes, is provided at a center of the mount rubber 75.

The through-hole 75a has: a small-diameter section 75aa arranged on the housing 30 side; and a large-diameter section 75ab that is arranged on an opposite side from the housing 30 side in a co-axially continuous manner from the small-diameter section 75aa. The sleeve section 45 of the bracket 41 is fitted to the large-diameter section 75ab. An inner circumferential surface of the small-diameter section 75aa is in contact with an outer circumferential surface of the fixture member 80.

On an outer circumferential surface of the mount rubber 75, a locking groove 77 is formed for an entire circumference. When the locking groove 77 of the mount rubber 75 is locked to the locking projection 49 of the bracket 41, the mount rubber 75 is held in the recessed section 47 of the bracket 41. At this time, the mount rubber 75 and the bracket 41 may adhere each other by an adhesive.

The recessed section 47 of the bracket 41 is formed such that a depth thereof is less than a length in a penetrating direction of the fixture member 80 in the mount rubber 75. Thus, the mount rubber 75 is partially projected from the recessed section 47 of the bracket 41.

In this way, the hydraulic unit 10 is attached to the bracket 41 such that, while one end surface of the mount rubber 75 comes in contact with the housing 30 for the hydraulic unit 10, the bracket 41 does not contact the housing 30.

The fixture member 80 includes a fixed section 90 and a coupled section 81. The fixed section 90 is fixed to the housing 30 for the hydraulic unit 10. The coupled section 81 is coupled to the fixed section 90 in an axial direction.

The fixed section 90 includes a first pin 91 and a tip 93. An insertion hole 95 is formed on an end surface of the first pin 91 on the coupled section 81 side. The coupled section 81 includes a head 82, a flange 87, a second pin 83, and a tip 85. These head 82, flange 87, second pin 83, tip 85, first pin 91, insertion hole 95, and tip 93 are provided on the same axis.

When the tip 93 of the fixed section 90 is inserted in a support hole 31 formed in the housing 30, the fixture member 80 is fixed to the housing 30. In this embodiment, the tip 93 of the fixed section 90 is press-fitted into the support hole 31 of the housing 30.

The tip 93 of the fixed section 90 is formed to have a smaller diameter than the first pin 91, and an end surface of the first pin 91 is in contact with the lower surface 30*b* of the housing 30 on a circumferential edge of the support hole 31. The end surface of the mount rubber 75 is in contact with the lower surface 30*b* of the housing 30 for the hydraulic unit 10.

When the tip 85 of the coupled section 81 is inserted in the insertion hole 95 of the fixed section 90, the coupled section 81 is coupled to the fixed section 90. In this embodiment, the insertion hole 95 of the fixed section 90 is formed with a female screw, the tip 85 of the coupled section 81 is formed with a male screw, and the tip 85 of the coupled section 81 is threaded to the insertion hole 95 of the fixed section 90.

Each of the first pin 91 of the fixed section 90 and the second pin 83 of the coupled section 81 is configured as a portion in a straight pin shape that does not have a thread groove on an outer circumferential surface thereof. In the present specification, the "straight pin shape" means a columnar shape that is not formed with a thread groove on an outer circumferential surface.

The first pin 91 and the second pin 83 are formed to have the same diameter. Accordingly, when the coupled section 81 is coupled to the fixed section 90, the first pin 91 and the second pin 83 are formed as an integrated pin in the straight pin shape.

In the example illustrated in FIG. 3, the second pin 83 of the coupled section 81 is arranged in the opening 44 that is formed on an inner side of the sleeve section 45 of the bracket 41. The first pin 91 of the fixed section 90 is arranged from the opening 44, which is formed on the inner side of the sleeve section 45, to the small-diameter section 75*aa* of the through-hole 75*a* in the mount rubber 75.

The flange 87 provided in the coupled section 81 is formed to have a larger diameter than the head 82 and the second pin 83, and is formed such that a large area thereof comes in contact with the bracket 41. The flange 87 comes in contact with the bracket 41 on a circumferential edge of the opening 44 of the bracket 41.

The flange 87 holds the mount rubber 75 in a compressed state via the bracket 41. More specifically, the tip 93 of the fixed section 90 is press-fitted into the support hole 31 of the housing 30 for the hydraulic unit 10 such that the end surface of the first pin 91 of the fixed section 90 abuts the lower surface 30*b* on the circumferential edge of the support hole 31 of the housing 30.

In addition, the tip 85 of the coupled section 81 is threaded to the insertion hole 95 of the fixed section 90 such that an end surface of the second pin 83 of the coupled section 81 abuts the end surface of the first pin 91 of the fixed section 90. At this time, the flange 87 brings the bracket 41 into a pressed state to the housing 30 side. In this way, the mount rubber 75 is held in the compressed state between the lower surface 30*b* of the housing 30 and the bracket 41.

The outer circumferential surface of the first pin 91 of the fixed section 90 comes in contact with the inner circumferential surface of the small-diameter section 75*aa* of the through-hole 75*a* in the mount rubber 75. Since the mount rubber 75 is held in the compressed state, the first pin 91 of the fixed section 90 is in a state where an elastic force of the mount rubber 75 is applied thereto.

Accordingly, the first support section 42 is firmly fixed to the housing 30 for the hydraulic unit 10 without using a sleeve member, and the bracket 41 is firmly held between the mount rubber 75 and the flange 87 of the coupled section 81. As described above, the hydraulic unit 10 is firmly supported by the bracket 41 via the first support section 42.

The mount rubber 75 is interposed between the housing 30 for the hydraulic unit 10 and the bracket 41. Thus, a vibration of the vehicle body, or the like is prevented from being transferred from the bracket 41 to the hydraulic unit 10. Therefore, it is possible to reduce such a possibility that the hydraulic unit 10 is detached from the bracket 41.

As described above, each of the first pin 91 and the second pin 83 of the fixture member 80 is configured as the portion in the straight pin shape that does not have the thread groove on the outer circumferential surface thereof. Thus, even in the case where the brake hydraulic pressure controller 70 vibrates in a state where the mount rubber 75 elastically contacts the outer circumferential surface of the first pin 91, a portion of the mount rubber 75 that contacts the first pin 91 is less likely to be damaged.

FIG. 4 is a view for illustrating a situation where the hydraulic unit 10 is assembled to the bracket 41.

For example, a worker fixes the fixed section 90 of the fixture member 80 to the housing 30 for the hydraulic unit 10 in advance. More specifically, the worker press-fits the tip 93 of the fixed section 90 into the support hole 31 of the housing 30 for the hydraulic unit 10 such that the end surface of the first pin 91 of the fixed section 90 abuts the lower surface 30*b* on the circumferential edge of the support hole 31.

Since it is configured that the tip 93 of the fixed section 90 is press-fitted into the support hole 31 of the housing 30, the first pin 91 can be configured to have the straight pin shape.

In addition, the worker accommodates the mount rubber 75 in the recessed section 47 formed in the bracket 41 so as to hold the mount rubber 75 by the bracket 41. When the locking groove 77 of the mount rubber 75 is locked to the locking projection 49 of the bracket 41, the mount rubber 75 is held by the bracket 41. At this time, the mount rubber 75 does not have to be press-fitted into the recessed section 47 of the bracket 41.

Next, the worker fits the small-diameter section 75*aa* of the through-hole 75*a* in the mount rubber 75 onto the first pin 91 of the fixed section 90, which is fixed to the housing 30. Furthermore, the worker inserts the second pin 83 of the coupled section 81 of the fixture member 80 in the opening 44 of the bracket 41.

After the above steps, the worker threads the tip 85 of the coupled section 81 to the insertion hole 95 provided in the first pin 91 of the fixed section 90 such that the end surface of the second pin 83 of the coupled section 81 abuts the end surface of the first pin 91 of the fixed section 90.

The tip 85 of the coupled section 81 may be press-fitted into the insertion hole 95 of the first pin 91 of the fixed section 90. However, the tip 85 is preferably threaded to the insertion hole 95 in order to improve workability at the time of detaching the hydraulic unit 10 from the bracket 41 and to allow reuse of the fixture member 80.

At the time, in an uncompressed state (a state before assembly) of the mount rubber 75, a diameter D1 of the small-diameter section 75*aa* of the through-hole 75*a* may be larger than a diameter D2 of the outer circumferential surface of the first pin 91 in the fixed section 90. When the diameter D1 is larger than the diameter D2, the fixed section 90 can easily be inserted in the small-diameter section 75*aa* of the through-hole 75*a*.

A diameter D3 of the opening 44 of the bracket 41 may be substantially the same as the diameter D2 of each of the first pin 91 of the fixed section 90 and the second pin 83 of the coupled section 81, or may be slightly larger than the diameter D2. When the diameter D3 and the diameter D2 are substantially the same, the sleeve section 45 of the bracket 41 is stably supported by the fixture member 80.

In the case where the diameter D3 is slightly larger than the diameter D2, it is possible to easily perform work to insert the second pin 83 of the coupled section 81 in the opening 44 of the bracket 41. Also, in this case, the bracket 41 is supported by the fixture member 80 via the mount rubber 75.

In addition, in the uncompressed state (the state before the assembly) of the mount rubber 75, a sum H1 of a height (an axial length) of the mount rubber 75 and the thickness of the bracket 41 may be greater than a sum (H2+H3) of an axial length H2 of the first pin 91 of the fixed section 90 and an axial length H3 of the second pin 83 of the coupled section 81 in the fixture member 80.

In this way, when the fixture member 80 is coupled such that the end surface of the first pin 91 of the fixed section 90 abuts the lower surface 30b of the housing 30 and that the end surface of the second pin 83 of the coupled section 81 abuts the end surface of the first pin 91 of the fixed section 90, the mount rubber 75 can be held in the compressed state between the bracket 41 and the lower surface 30b of the housing 30.

FIG. 5 illustrates a situation where the mount rubber 75 is held in the compressed state between the bracket 41 and the lower surface 30b of the housing 30. When the mount rubber 75 is compressed in the axial direction of the fixture member 80, the diameter of the through-hole 75a of the mount rubber 75 is reduced by the elastic force. Accordingly, the inner circumferential surface of the small-diameter section 75aa of the through-hole 75a is pressed against and contacts the outer circumferential surface of the first pin 91 of the fixed section 90 in the fixture member 80.

Thus, even in the case where the diameter D1 of the small-diameter section 75aa of the through-hole 75a in the mount rubber 75 is set to be larger than the diameter D2 of the outer circumferential surface of the first pin 91 in the fixed section 90 before the assembly, the mount rubber 75 is fixedly assembled to the fixture member 80.

An axial length of each of the first pin 91 of the fixed section 90 and the second pin 83 of the coupled section 81 in the fixture member 80 may appropriately be designed in accordance with a thickness (the axial length) of the mount rubber 75 to be assembled, the thickness of the bracket 41, and the like. For example, while the axial length of one of the first pin 91 of the fixed section 90 and the second pin 83 of the coupled section 81 is fixed, the axial length of the other may appropriately be changed.

FIG. 6 and FIG. 7 each illustrate an example in which the mount rubber 75 is thickened in the first support section 42 illustrated in FIG. 3. FIG. 6 illustrates an example in which the axial length of the second pin 83 of a coupled section 81A is changed from that in the first support section 42 illustrated in FIG. 3. FIG. 7 illustrates an example in which the axial length of the first pin 91 in a fixed section 90A is changed from that in the first support section 42 illustrated in FIG. 3.

In the example illustrated in FIG. 6, as a common component with the example illustrated in FIG. 3, the fixed section 90 of the fixture member 80 is fixed to the housing 30 for the hydraulic unit 10. Meanwhile, in response to an axial length of a mount rubber 75A, the axial length of the second pin 83 in the coupled section 81A is set to be longer than that in the example illustrated in FIG. 3.

The inner circumferential surface of the through-hole 75a of the mount rubber 75A not only contacts the first pin 91 of the fixed section 90 but also contacts the outer circumferential surface of the second pin 83 of the coupled section 81. In this way, the hydraulic unit 10 can be attached to the bracket 41 in accordance with any of various vehicle component layouts while the common fixed section 90 is used.

In the example illustrated in FIG. 7, the coupled section 81 of the fixture member 80 is used as the common component with the example illustrated in FIG. 3. Meanwhile, the fixed section 90A is configured that the axial length of the first pin 91 is set to be longer than that in the example illustrated in FIG. 3 in response to the axial length of a mount rubber 75A.

In this way, the hydraulic unit 10 can be attached to the bracket 41 in accordance with any of the various vehicle component layouts while the common coupled section 81 is used.

FIG. 8 illustrates yet another modified example of the support section. In the modified example, it is configured that, while a gap between a bracket 41 and the housing 30 for the hydraulic unit 10 is set to be the same as that in the example illustrated in FIG. 3, a height (an axial length) of amount rubber 175 is increased.

A recessed section 147 of the bracket 41 has a small-diameter section 148 on a bottom side. Similarly, the mount rubber 175 also has a small-diameter section 176 that is fitted to the small-diameter section 148 of the recessed section 147 in the bracket 41.

The coupled section 81 of the fixture member 80 is the common component with the example illustrated in FIG. 3. Meanwhile, a fixed section 90B is configured that the axial length of the first pin 91 is set to be longer than that in the example illustrated in FIG. 3 in response to the height of the mount rubber 175.

With the first support section 42 according to the modified example, the hydraulic unit 10 can be attached to the bracket 41 in accordance with any of the various vehicle component layouts while the common coupled section 81 is used and the height of the mount rubber 175 is increased.

As it has been described so far, in the brake hydraulic pressure controller 70 according to this embodiment, at least one of the first support section 42 and the second support section 43 is configured to include the fixture member 80 and the mount rubber 75. The fixture member 80 has: the fixed section 90 that is fixed to the housing 30 for the hydraulic unit 10; and the coupled section 81 that is coupled to the fixed section 90 in the axial direction so as to press the bracket 41 to the housing 30 side. The mount rubber 75 is held in the compressed state between the bracket 41 and the housing 30.

Accordingly, in the state where the fixed section 90 is fixed to the housing 30, the coupled section 81 is coupled to the fixed section 90 while the mount rubber 75 and the bracket 41 are fitted to the fixed section 90. In this way, the hydraulic unit 10 can easily be attached to the bracket 41. Meanwhile, when the hydraulic unit 10 is detached from the bracket 41, the coupled section 81 is decoupled from the fixed section 90. In this way, the hydraulic unit 10 can easily be detached.

In addition, the fixture member 80 includes the fixed section 90 and the coupled section 81 that are coupled to each other in the axial direction. Thus, by changing at least one of the axial length of the fixed section 90 and the coupled section 81, the support section can be applied to any of various vehicle layouts.

In this embodiment, the diameter of the tip 93 of the fixed section 90 in the fixture member 80 is set to be smaller than the diameter of the first pin 91. Accordingly, the end surface of the first pin 91 can abut the surface of the housing 30 on the circumferential edge of the support hole 31, into which the tip 93 is press-fitted. In this way, the first support section 42 and the second support section 43 are firmly attached to the housing 30. Therefore, it is possible to reduce such a possibility that the hydraulic unit 10 is detached from the bracket 41.

In this embodiment, each of the first pin 91 of the fixed section 90 and the second pin 83 of the coupled section 81 in the fixture member 80, which contacts the mount rubber 75, has the straight pin shape that does not have the thread groove. Accordingly, even when the sleeve member is not provided around the fixture member 80, it is possible to prevent the damage on the mount rubber 75 by the vibration of the vehicle, or the like.

In this embodiment, the bracket 41 has the sleeve section 45 that is fitted to the through-hole 75a of the mount rubber 75. Accordingly, the mount rubber 75 can be assembled to the bracket 41 in advance. Therefore, it is possible to improve attachability/detachability of the hydraulic unit 10 to/from the bracket 41.

In this embodiment, the bracket 41 has the recessed section 47 in which the mount rubber 75 is partially accommodated. Accordingly, the mount rubber 75 can be assembled to the bracket 41 in advance. Therefore, it is possible to further improve the attachability/detachability of the hydraulic unit 10 to/from the bracket 41.

In this embodiment, the diameter D1 of the through-hole 75a of the mount rubber 75 before the assembly is set to be larger than the diameter D2 of the outer circumferential surface of the first pin 91 in the fixed section 90 of the fixture member 80. Accordingly, the mount rubber 75 can easily be fitted onto the first pin 91.

In this embodiment, the sum H1 of the height of the mount rubber 75 before the assembly and the thickness of the bracket 41 is set to be greater than the sum of the axial length H2 of the first pin 91 of the fixed section 90 and the axial length H3 of the second pin 83 of the coupled section 81 in the fixture member 80. Accordingly, in the case where the mount rubber 75 is brought into the compressed state after the assembly, the diameter of the through-hole 75a is reduced by the elastic force. Thus, the inner circumferential surface of the through-hole 75a can be pressed against and contact the first pin 91 or the second pin 83. In this way, while the assemblability is improved by increasing the above diameter D1 to be larger than the diameter D2, the mount rubber 75 can fixedly be assembled to the fixture member 80.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

The description has been made on the above embodiment with the assumption that the mount rubber has one type of the mount rubber. However, as will be described below, the configuration of the mount rubber can appropriately be changed.

Each of FIG. 9 and FIG. 10 is a view illustrating another example of the configuration of the mount rubber. The mount rubber illustrated in FIG. 3 is configured to include only one type of the vibration absorbing member. Meanwhile, in the examples illustrated in FIG. 9 and FIG. 10, the mount rubber includes two types of the vibration absorbing member with different rebound resilience properties from each other.

In the example illustrated in FIG. 9, a first vibration absorbing member 75B constitutes a main portion of the mount rubber, and a second vibration absorbing member 75C having the different rebound resilience from the first vibration absorbing member 75B is arranged to have a contact section 75Ca that directly contacts the housing 30 in a state where the second vibration absorbing member 75C is assembled to the housing 30. For the assembly of the mount rubber 75, an annular recessed section, in which the second vibration absorbing member 75C is accommodated, is formed on a surface of the first vibration absorbing member 75B that opposes the housing 30, and the second vibration absorbing member 75C is engaged with the annular recessed section. In this way, the mount rubber 75 having two different types of materials can be formed.

By combining the first vibration absorbing member 75B and the second vibration absorbing member 75C having the different rebound resilience properties from each other, a dynamic elastic modulus Kc of each of the support sections 42, 43 is regulated, and the support sections 42, 43 are designed to avoid a natural frequency of a vibration system of the hydraulic unit 10. In this way, it is possible to prevent occurrence of a resonance phenomenon.

A material having the higher rebound resilience property than the rebound resilience of the first vibration absorbing member 75B is selected for the second vibration absorbing member 75C. More specifically, EPDM can be selected for the first vibration absorbing member 75B, and silicon can be selected for the second vibration absorbing member 75C.

In the example illustrated in FIG. 10, a second vibration absorbing member 75D is arranged near a substantial center of the first vibration absorbing member 75B in the thickness direction. In order to attach the mount rubber 75 in this example to the bracket 41, first, before the mount rubber 75 is attached to the recessed section 47 of the bracket 41, a radial bored section is formed in the first vibration absorbing member 75B. Then, in a state where the second vibration absorbing member 75D in an annular shape is inserted in the bored section, the mount rubber 75 can be attached to the recessed section 47 of the bracket 41.

In addition, the recessed section 47 of the bracket 41 is formed with openings 79, from which drive heat generated in the mount rubber 75 is released. As illustrated in FIG. 10, the openings 79 are arranged at equally-spaced intervals on a circumference and on the outside of an outer edge of the flange 87 of the coupled section 81 so as to surround the opening 44 of the bracket 41. FIG. 10 illustrates the example in which the eight openings 79 are provided at the equally-spaced intervals. Note that FIG. 10 illustrates the example in which the openings 79 are provided on the bottom surface of the bracket 41; however, a similar effect is obtained even when the openings 79 are provided on the lateral surface of the bracket 41.

With the configuration of the mount rubber 75 illustrated in FIG. 9 and FIG. 10, the two types of the vibration absorbing members having the different rebound resilience from each other are selected, so as to avoid the natural frequency of the vibration system of the hydraulic unit 10. In this way, it is possible to prevent the occurrence of the resonance phenomenon of the hydraulic unit 10. In addition, such a phenomenon that energy applied to the vibration absorbing member is partially lost and converted to thermal energy by the vibration of the hydraulic pressure controller 70 and the vibration absorbing member generates heat possibly occurs. However, with the openings 79 provided in the bracket 41, it is possible to efficiently release the drive heat generated by vibration absorbing action of the mount rubber 75.

The description has been made so far on the case where the configuration of having the mount rubber with the different rebound resilience properties is applied to the structure illustrated in FIG. 3. Similar operational effects can be exerted in the case where such a configuration is applied to each of the structures illustrated in FIG. 6 to FIG. 8.

In the above embodiment, the coupled section 81 of the fixture member 80 presses the bracket 41 to the housing 30 side by the flange 87. However, the present invention is not limited to such an example. For example, the flange may not be provided, and a washer as another member may be used. In this case, the washer functions as a pressed section that is pressed by a head of a bolt, and the bracket 41 is pressed to the housing 30 side via the washer.

In addition, in the above embodiment, the bracket 41 has both of the recessed section 47, in which the mount rubber 75 is partially accommodated, and the sleeve section 45, which is fitted to the through-hole 75a of the mount rubber 75. However, one of the recessed section 47 and the sleeve section 45 may not be provided. Even in the case where the bracket 41 only has one of these, the attachability/detachability of the hydraulic unit 10 can be improved by assembling the mount rubber 75 to the bracket 41 in advance.

In the above embodiment, the mount rubber 75 is held by the bracket 41 by locking the locking groove 77 of the mount rubber 75 to the locking projection 49 of the bracket 41. However, a configuration of a locked portion is not limited to such an example.

FIG. 11 is a view for illustrating another example of the locked portion. In the illustrated first support section 42, a locking claw 78 is formed on the outer circumferential surface of the mount rubber 75. A plurality of the locking claws 78 may be formed on the circumferential surface of the mount rubber 75. The bracket 41 is formed with a locking hole 51 at a position corresponding to the locking claw 78 of the mount rubber 75. The locking hole 51 may be a recessed section.

Also, with the configuration illustrated in FIG. 11, the hydraulic unit 10 can be attached/detached to/from the bracket 41 in the state where the mount rubber 75 is assembled to and held by the bracket 41 in advance. Thus, the attachability/detachability of the hydraulic unit 10 can be improved.

In the above embodiment, the description has been made on the brake hydraulic pressure controller that is mounted on the a motorcycle as the example. However, the present invention is not limited to such an example. The brake hydraulic pressure controller may be mounted on another vehicle such as an automobile.

REFERENCE SIGNS LIST

10: Hydraulic unit
30: Housing
30b: Lower surface
30c: Lateral surface
31: Support hole
41: Bracket
41a: Plate section
41aa: First surface
41ab: Second surface
41b: Lateral wall section
41d: Opening
42: First support section
43: Second support section
44: Opening
70: Brake hydraulic pressure controller
75: Mount rubber
75a: Through-hole
80: Fixture member
81: Coupled section
83: Second pin
85: Tip
87: Flange
90: Fixed section
91: First pin

What is claimed is:

1. A brake hydraulic pressure controller (70) comprising:
a hydraulic unit (10) that executes brake control by controlling a hydraulic pressure of a brake fluid to be supplied to a braking section (111, 116); a bracket (41) that is attached to a vehicle body; and a support section (42, 43) that is assembled to the bracket (41) to support the hydraulic unit (10), wherein
the support section (42, 43) includes: a fixture member (80) that is fixed to a housing (30) of the hydraulic unit (10); and a vibration absorbing member (75) that is interposed between the housing (30) and the bracket (41) and has a through-hole (75a) through which the fixture member (80) passes, and
the vibration absorbing member (75) includes: a first vibration absorbing member (75B) that has specified rebound resilience; and a second vibration absorbing member (75C, 75D) that has higher rebound resilience than the specified rebound resilience, and, in a state of being accommodated in a recessed section (47) of the bracket (41), the vibration absorbing member (75) is held between the housing (30) and the bracket (41),
wherein the bracket (41) has a sleeve section (45) that is provided with an opening (44) and is fitted to the through-hole (75a) of the vibration absorbing member (75), the opening (44) being provided along a penetrating direction of the fixture member (80), and wherein the fixture member (80) passes through the opening (44),
wherein the first vibration absorbing member (75B) contacts the housing (30) and contacts the bracket (41),
wherein the second vibration absorbing member (75C) has a contact section (75Ca) that contacts the housing (30), and
wherein the first vibration absorbing member (75B) includes an annular recess in which the second vibration absorbing member (75C) is accommodated.

2. The brake hydraulic pressure controller (70) according to claim 1, wherein the recessed section (47) of the bracket (41) has an opening (79) from which heat generated in the vibration absorbing member (75) is released.

3. The brake hydraulic pressure controller (70) according to claim 1, wherein the fixture member (80) has: a fixed section (90) that is fixed to the housing (30); and a coupled section (81) that is coupled to the fixed section (90) in an axial direction so as to press the bracket (41) to the housing (30) side.

4. The brake hydraulic pressure controller (70) according to claim 3, wherein a tip (93) of the fixed section (90) is press-fitted into a support hole (31) provided in the housing (30).

5. The brake hydraulic pressure controller (70) according to claim 3, wherein the fixed section (90) and the coupled section (81) are coupled to each other by press-fitting.

6. The brake hydraulic pressure controller (70) according to claim 3, wherein the fixed section (90) and the coupled section (81) are coupled to each other by threading.

7. A method for attaching a hydraulic unit (10) to a vehicle body, the hydraulic unit (10) executing brake control by controlling a hydraulic pressure of a brake fluid to be supplied to a braking section (111, 116), the method comprising:

- a step of accommodating a vibration absorbing member (75) in a recessed section (47) of a bracket (41) that is fixed to the vehicle body and holding the vibration absorbing member (75) by the bracket (41), wherein the vibration absorbing member (75) includes: a first vibration absorbing member (75B) that has specified rebound resilience; and a second vibration absorbing member (75C, 75D) that has higher rebound resilience than the specified rebound resilience;
- a step of fixing the bracket (41), to which the vibration absorbing member (75) is attached, to a housing (30) of the hydraulic unit (10); and
- a step of fixing the bracket (41) to a vehicle-body side bracket (60, 61) provided in the vehicle body, wherein the bracket (41) has a sleeve section (45) that is provided with an opening (44) and is fitted to a through-hole (75*a*) of the vibration absorbing member (75), the opening (44) being provided along a penetrating direction of a fixture member (80), and wherein the fixture member (80) passes through the opening (44), wherein the first vibration absorbing member (75B) and the second vibration absorbing member (75C) contact the housing (30), wherein the first vibration absorbing member (75B) contacts the bracket (41), and wherein the first vibration absorbing member (75B) includes an annular recess in which the second vibration absorbing member (75C) is accommodated.

* * * * *